United States Patent [19]

Cuscurida et al.

[11] 3,960,788

[45] June 1, 1976

[54] MODIFIED ISOCYANATE FOAMS

[75] Inventors: Michael Cuscurida; Thomas Howard Austin, both of Austin, Tex.

[73] Assignee: Jefferson Chemical Company,, Houston, Tex.

[22] Filed: Sept. 23, 1974

[21] Appl. No.: 508,454

[52] U.S. Cl. .................... 260/2.5 AW; 260/2.5 AT
[51] Int. Cl.² ........................................ C08G 18/76
[58] Field of Search ................ 260/2.5 AT, 2.5 AW

[56] References Cited
UNITED STATES PATENTS

| | | | |
|---|---|---|---|
| 3,344,162 | 9/1967 | Rowton | 260/2.5 AT |
| 3,644,232 | 2/1972 | Bernard | 260/2.5 AT |
| 3,676,497 | 7/1972 | Recchia | 260/2.5 AT |

*Primary Examiner*—C. Warren Ivy
*Attorney, Agent, or Firm*—James L. Bailey; John R. Kirk, Jr.

[57] ABSTRACT

Modified isocyanurate foams having excellent thermal stability, low friability, adhesion, cell structure and the like are disclosed. The novel foams are obtained by the polymerization of a mixture of methylene-bridged polyphenylpolyisocyanates having an average functionality of about 2.1–2.4 consisting essentially of from about 60% to about 75% by weight methylene diphenylisocyanate having an isomer content consisting essentially of about 60 to about 80% 4,4'-isomer, about 18% to about 33% 2,4'-isomer, and about 2% to about 7% 2,2'-isomer by weight of the methylene diphenylisocyanate, and about 25% to about 40% by weight higher functionality methylene-bridged polyphenyl-polyisocyanates, in the presence of an isocyanurate group formation catalyst, a blowing agent and a polyether or polyester polyol. The novel foams are useful for preparing rigid components exposed to high temperatures and can be formulated to be fire resistant.

5 Claims, No Drawings

MODIFIED ISOCYANATE FOAMS

BACKGROUND OF THE INVENTION

1. Field of the Invention

The invention relates to the art of foamed polymers and more particularly pertains to isocyanurate foams prepared by the polymerization of methylene-bridged polyphenylpolyisocyanate mixtures.

2. Description of the Prior Art

The preparation of isocyanurate foams by the polymerization of polymethylene polyphenylpolyisocyanates is well-known. Generally, these polymers are prepared by mixing together a polymethylene polyphenylpolyisocyanate mixture, an inert blowing agent, a trimerization or isocyanurate group formation catalyst, and a modifying or stabilizing agent. The resulting foam is rigid, has relatively high thermal stability and can be used for thermal insulation, a building material, and the like. Examples of some prior art isocyanurate foams and methods of preparation are described in U.S. Pat. Nos. 3,745,133; 3,644,232; 3,676,380; 3,168,483; and 3,516,950, to name a few.

However, the heretofore known polyisocyanurate foams based on polymethylene polyphenylpolyisocyanate mixtures have suffered from one or more disadvantages, such as being susceptible to flame spreadability, high friability, irregular cell structure, low adhesiveness and the like. Due to one or more of these disadvantages, the prior art polyisocyanurate foams have been less than satisfactory and leave much to be desired.

We have now found that it is possible to prepare modified polyisocyanurate foams that do not exhibit any of the aforesaid disadvantages. We have unexpectedly discovered that, by the utilization of mixtures of methylene-bridged polyphenylpolyisocyanates containing specific amounts of the 4,4'-, 2,4'-, and 2,2'-isomers of methylene diphenylisocyanate and having an average functionality of about 2.1–2.4, modified isocyanurate foams can be produced that have excellent thermal stability, uniform cell structure, excellent adhesion and low friability. The overall properties and details of preparation of these foams are unexpectedly superior to those foams disclosed in the prior art.

SUMMARY OF THE INVENTION

The present invention is an improved modified cellular polyisocyanurate comprised of the reaction product formed by bringing together, in the presence of an inert blowing agent, an isocyanurate group formation catalyst and a foam stabilizer or modifier such as polyether or polyester polyol having a hydroxyl number within the range of from about 100 to about 500 and a molecular weight of from about 100 to about 1,000, a mixture of methylene-bridged polyphenylpolyisocyanates having an average functionality of about 2.1 to about 2.4 consisting essentially of from about 60% to about 75% by weight methylene diphenylisocyanate and from about 40% to about 25% by weight higher functionality methylene-bridged polyphenylpolyisocyanates. The methylene diphenylisocyanate has an isomer content consisting essentially of about 60% to about 80% 4,4'-isomer, about 18% to about 33% 2,4'-isomer, and about 2% to about 7% 2,2'-isomer by weight of the methylene diphenylisocyanate present.

DETAILED DESCRIPTION OF THE INVENTION

The modified isocyanurate foams of the present invention are prepared by mixing the methylene-bridged polyphenylpolyisocyanate mixture, an inert blowing agent, an isocyanurate group formation catalyst and a polyol under conventional foaming conditions utilizing conventional mixing devices employed in the manufacture of polymer foams. The mixing of the materials for the formation of the reaction product is not critical to the invention. Examples of conventional polymer foam formation processes and equipment are described in Ferrigno, "Rigid Plastic Foams", Reinhold Publishing Corporation, New York, N.Y. 1963.

The mixtures of methylene-bridged polyphenylpolyisocyanates employed in the invention are well-known and readily commercially available. For example, one such mixture is sold under the trademark THANATE P-220, Jefferson Chemical Company, Inc., Houston, Tex. The polymethylene polyphenylpolyisocyanates are prepared by the well-known phosgenation of the corresponding methylene-bridged polyphenylpolyamine condensation reaction products derived from the condensation reaction of aniline and formaldehyde in the presence of hydrochloric acid or an alumina-silica catalyst. Illustrative of known methods for preparing methylene-bridged polyamines and polymethylene polyphenylpolyisocyanates therefrom employed in the present invention are those described in U.S. Pat. Nos. 3,362,979, 3,344,162 and 3,644,232 and Canadian Patent No. 767,690 (1967).

Preferably, the methylene-bridged polyphenylpolyisocyanate mixture consists essentially of about 67.4 wt.% methylene diphenylisocyanate and has an isomer content of about 74% 4,4'-, about 22% 2,4'-, and about 4.0% 2,2'-isomers by weight of the methylene diphenylisocyanate. The remainder of the mixture includes higher functionality polymethylene polyphenylpolyisocyanates and the overall mixture has an average functionality of about 2.2. The preferred mixture further has a viscosity of about 60 cps. at 25°C. and about 31% free isocyanate groups.

Surprisingly, we have now found that the utilization of the above-described polymethylene polyphenylpolyisocyanate mixtures having the specified methylene diphenylisocyanate and isomeric contents trimerize more rapidly in the presence of a trimerization or isocyanurate group formation catalyst than polymethylene polyphenylpolyisocyanate mixtures containing more or less methylene diphenylisocyanate and/or different isomer contents. Modified isocyanurate foams prepared from these isocyanate mixtures exhibit superior uniform cell structure with closed cell content, superior adhesion and low friability without any sacrifice to thermal stability or fire resistance.

Any conventional catalyst or catalyst combination for the polymerization of isocyanate-forming products containing an isocyanurate ring structure can be employed. Such trimerization or isocyanurate group formation catalysts are well-known and include strong bases, alkali metal salts of carboxylic acids, non-basic metal salts of carboxylic acids and aliphatic tertiary amines. For example, suitable strong bases include quaternary ammonium hydroxide, alkali metal hydroxide and alkali metal alkoxides. Suitable alkali metal salts of carboxylic acids include, for example, sodium acetate, potassium octoate, potassium acetate, sodium benzoate, and the like. Examples of suitable tertiary amines are N,N'-diethylpiperazine, N,N'-dimethylpiperazine, trialkylamines such as trimethylamine, triethylamine, triethylenediamine, tributylamine, 2,4,6-tris(-dimethylaminomethyl)phenol, and N,N',N''-tri(dimethylamino-propyl)hexhydra-s-triazine and the like.

The particular amount of catalyst employed can vary over a wide range and is not critical so long as it is present in an amount sufficient to promote trimerization of the isocyanate mixture. Preferably, the catalyst is added in an amount of about 0.0005 to about 0.025 equivalents for each equivalent of isocyanate employed. An optimum amount would be from about 0.001 to about 0.01 equivalents per equivalent of isocyanate. Expressed in other terms, the catalyst is preferably added in an amount of from about 0.03 up to about 5.0 parts by weight, based upon the total foam formulation, i.e. 100 parts by weight.

As mentioned hereinbefore, as known, modifying agents such as polyols are usually employed in the preparation of rigid isocyanurate foams. Thus, in the practice of the present invention, we prefer to prepare the novel modified isocyanurate foams by polymerizing the isocyanurate mixture described hereinabove in the presence of a polyether or polyester polyol having a hydroxyl number of from about 100 to about 500 and a molecular weight of about 100 to about 1,000. Polyether polyols useful in the invention are those diols, triols, tetrols, pentols and mixtures thereof having a molecular weight of from about 100 to about 1,000. The diols are generally polyalkylene ether glycols such as polyethylene ether glycol, polypropylene ether glycol, polybutylene ether glycol, and the like, and mixtures thereof. Mixed polyether polyols can also be used such as the condensation product of an alkylene oxide with a polyhydric alcohol having 2 to 6 primary hydroxyl groups such as ethylene glycol, propylene glycol, glycerol, trimethylolpropane, 1,2,6-hexanetriol, pentaerythritrol, sorbitol and the like. These polyether polyols are well-known and may be prepared by any known process, such as, for example, the processes discussed in Encyclopedia of Chemical Technology, Vol. 7, pages 257–262, published by Interscience Publishers, Inc. in 1951.

Polyester polyols useful in the present invention include those prepared by reaction of glycols of the formula:

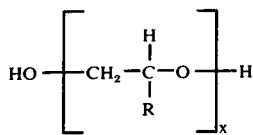

where R is hydrogen or alkyl having 1 to 4 carbon atoms and $x$ is 1–3, with dicarboxylic acid of the type $HO_2C(CH_2)_yCO_2H$ where y is 0–4. They may also be prepared by reaction of diols of the formula $HO\text{-}[CH_2]_z\text{-}OH$ where $z$ is 3–6 with the above-type polyester.

The amount of polyol employed is not critical, but preferably ranges in an amount of from about 0.1 to about 0.5 equivalents per equivalent of methylene-bridged polyphenylpolyisocyanate. Optimally, we employ about 0.2 to about 0.4 equivalents per equivalent of the isocyanate. Moreover, the polyol can be added to the isocyanate mixture as a separate component or as a preformed mixture with one or more of the other components.

Any inert blowing agent conventionally employed for the preparation of foamed polymeric materials may be used in the present invention. Illustrative blowing agents include the fluorocarbons, such as trichloromonofluoromethane, dichlorodifluoromethane, and methylene dichloride and water, or combinations thereof. Preferably, the blowing agent is employed in an amount of from about 0.1 to about 40 wt.% of the total formulation.

If desirable, the novel modified isocyanurate foams of the invention can be formulated to include flame retardant components to improve the fire retardancy of the foams. Any known fire retardant component compatible with rigid isocyanurate foams can be employed. This would include both the reactive and additive type fire retardants. Representatives of the additive types include halogenated organic phosphates such as tris(-chloroethyl)phosphate, tris(2,3-dibromopropyl)phosphate, triphenyl phosphite, diammonium phosphate, and antimony oxide. Representatives of the chemically bound types are diethyl-N,N'-bis(2-hydroxyethyl-)aminomethyl phosphonate, chlorendic acid derivatives, and phosphorous-containing polyols. When employed, the fire retardant component is added to the above-described isocyanate mixture, either as a single component or as a preformed mixture with some other component described hereinbefore, in an amount of about 1 to about 20 wt.% of the total foam formulation.

Furthermore, fillers can be employed in the preparation of the novel modified isocyanurate foams if desired in amounts within the range of about 0 to about 20 wt.% of the total foam formulation. Any conventional filler known in the art to be compatible with isocyanurate foam manufacture can be employed, such as hydrated alumina, polyethylene, aluminum powder, and various clays and talcs.

The invention will be further illustrated by the following specific examples which are given by way of illustration and not as limitations on the scope of this invention.

EXAMPLE I

Into a 500 ml., 3-necked flask equipped with a stirrer, thermometer, reflux condenser, and nitrogen source were charged 2.0 g. anhydrous potassium acetate and 200 g. of a mixture of methylene-bridged polyphenylpolyisocyanates having an average functionality of about 2.2 containing 67.4 wt.% methylene diphenylisocyanate and the remainder being higher functionality polymethylene polyphenylpolyisocyanates (viscosity 60 cps. at 25°C.; 31% free isocyanate). The isomeric content of the methylene diphenylisocyanate was 74.1% 4,4'-isomer, 22.2% 2,4'-isomer, and 3.7% 2,2'-isomer, by weight of the methylene diphenylisocyanate present (THANATE P-220, Jefferson Chemical Company, Inc., Houston, Tex. Maintaining a nitrogen purge, the charged mixture was heated to 150°C. and maintained for 3 hours. Numerous solids were noted at the end of the reaction which were removed by filtration, washed with acetone, and analyzed by infrared spectroscopy. Isocyanurate bands were detected in the 5.8–7.1 $\mu$ range. The treated methylene-bridged polyphenylpolyisocyanate mixture contained 27% free isocyanate and had a viscosity of 5500 cps. at 25°C.

Into a second 500 ml. 3-necked flask equipped as described hereinabove were charged 10 g. anhydrous potassium acetate and 1,000 g. of a polymethylene polyphenylpolyisocyanate mixture containing 45–50 wt.% methylene-bis(phenylisocyanate) and 50–55 wt.% higher functionality materials (viscosity 270 cps. at 25°C.; 31% free isocyanate) (PAPI The Upjohn Company, Kalamazoo, Michigan). The isomer content of the dimer was 97–99% 4,4'-, 1–3% 2,4'-, and 0% 2,2'-isomer, by weight of dimer. Maintaining a nitrogen purge, the mixture was heated at 150°C. for 5 hours. No solids were formed during the reaction. The mixture was filtered and infrared spectroscopy examination showed only a trace amount of isocyanurate at 5.8–7.1 μ. The treated mixture had a viscosity of 604 cps. at 25°C. and contained 29.6% free isocyanate.

A comparison of the treated methylene-bridged polyphenyl polyisocyanurate mixtures as described hereinabove illustrate the ease of trimerization of the isocyanate mixtures utilized in the present invention as compared to a related isocyanate mixture containing less methylene diphenylisocyanate of different isomer content.

EXAMPLE II

In this example, two samples of modified isocyanurate foams were prepared employing the following formulations:

| Formulation, p.b.w. | Sample 1 | Sample 2 |
|---|---|---|
| Thanol RS-700[1] | 11.6 | 11.3 |
| DC-193 silicone[2] | 0.5 | 0.5 |
| Fyrol CEF[3] | 9.2 | 9.2 |
| Potassium octoate in Thanol PPG-1000[4] | 2.0 | 2.0 |
| Fluorocarbon R11b[5] | 10.0 | 10.0 |
| Polymeric isocyanate | — | 67.0 |
| Polymeric isocyanate | 66.7 | — |
| Isocyanate index | 5.0 | 5.0 |

[1]Propylene oxide adduct of sorbitol, molecular weight 700; Jefferson Chemical Company, Inc.
[2]Silicone-polyether; Dow Corning Corp.
[3]Tris(chloroethyl)phosphate; Stauffer Chemical Company.
[4]50% solution; Jefferson Chemical Company, Inc. (polypropylene glycol with molecular weight of 1,000).
[5]Trichloromonofluoromethane, E.I. duPont de Nemours and Co.

The formulations of the two samples were identical except for the polymeric isocyanate employed. Sample 1 employed 66.7 parts by weight polymethylene polyphenylpolyisocyanate mixture having an average functionality of about 2.2 containing 67.4 wt.% methylene diphenylisocyanate (74.1% 4,4'-, 22.2% 2,4'-, and 3.7% 2,2'-isomers) and 32.6 wt.% higher functionality polymethylene polyphenylpolyisocyanates and having a viscosity of 60 cps. at 25°C. and 31% free isocyanate (THANATE P-220, supra). Sample 2 employed 67.0 parts by weight polymethylene polyphenylpolyisocyanate having an average functionality of 2.7 containing 47.5 wt.% methylene diphenylisocyanate (80.8% 4,4'-, 17.7% 2,4'-, and 1.5% 2,2'-isomers) and 52.5 wt.% higher functionality polymethylene polyphenylpolyisocyanate and having a viscosity of 270 cps. at 25°C. and 31% free isocyanate (THANATE P-270, Jefferson Chemical Company, Inc., Houston, Tex.). Each foam sample was prepared as follows: all of the reactants, except the polymeric isocyanate, were charged into a suitable one-quart container. The reaction mixture was then mixed 15–20 seconds using a high speed stirrer operated at approximately 4,200 r.p.m. Any fluorocarbon R11b which was lost during the mixing operation was then replaced. The polymeric isocyanate was then added and mixed with the high speed stirrer for 5–7 seconds. The foaming mixture was then poured into a 12 inch × 6 inch × 8 inch cardboard box. The details of preparation and foam properties were noted as set forth in the following Table I.

Table I

| Details of Preparation | Sample 1 | Sample 2 |
|---|---|---|
| Cream time, sec. | 11 | 13 |
| Rise time, sec. | 45 | 70 |
| Tack-free time, sec. | 35 | 55 |
| Properties | | |
| Density, pcf. | 2.4 | 2.6 |
| Compressive strength, psi | | |
| with rise | 30 | 36 |
| cross rise | 13 | 13 |
| Heat distortion temperature, °C. | 241 | 227 |
| Butler Chimney Test[1,2] | | |
| Weight retained, % | 97 | 96 |
| Seconds to extinguish | 10 | 10 |
| Flame height, in. | 3.5 | 3.7 |

[1]Control foam; % weight retention 94.8, seconds to extinguish 10, flame height 4.5 in.
[2]Kreuger, O.A. and Jackson, D.E., J. Cellular Plastics, 3, 497–501 (1967).

Table I illustrates the improved thermal stability of the inventive foam (Sample 1) as compared to a foam (Sample 2) prepared with a related polymeric isocyanate.

EXAMPLE III

In this example, two modified isocyanurate foam samples were prepared to illustrate that modified isocyanurate foams of this invention have superior cell structure and closed cell content, adhesion and lower friability as compared to foams employing a related polymethylene polyphenylpolyisocyanate. The two samples were prepared in accordance with the procedure described in Example II employing the following formulations:

| Formulation, p.b.w. | Sample 1 | Sample 2 |
|---|---|---|
| Thanol RS-700[1] | 11.0 | 11.0 |
| DC-193 silicone[2] | 0.5 | 0.5 |
| Fyrol CEF[3] | 9.2 | 9.2 |
| Potassium octoate in Thanol PPG-1000[4] | 2.0 | 2.0 |
| Fluorocarbon R11b[5] | 12.0 | 12.0 |
| Polymeric isocyanate | 65.3 | — |
| Polymeric isocyanate | — | 65.3 |
| Isocyanate index | 5.0 | 5.0 |

[1]Propylene oxide adduct of sorbitol, molecular weight 700; Jefferson Chemical Company, Inc.
[2]Silicone-polyether, Dow Corning Corp.
[3]Tris(chloroethyl)phosphate; Stauffer Chemical Company.
[4]50% solution, Jefferson Chemical Company, Inc.
[5]Trichloromonofluoromethane, E. I. duPont de Nemours and Co.

As noted, the formulations of the two samples were substantially identical except for the polymeric isocyanate employed. In Sample 1, the isocyanate was a polymethylene polyphenylpolyisocyanate mixture having a functionality of about 2.2 containing 67.4 wt.% isomeric methylene diphenylisocyanate (74.1% 4,4'-, 22.2% 2,4'-, 3.7% 2,2'-isomer), and 32.6 wt.% higher functionality polymethylene polyphenylpolyisocyanates (viscosity 60 cps. at 25°C.; 31% free isocyanate). The isocyanate of Sample 2 was a mixture of polymethylene polyphenylpolyisocyanates having a functionality of about 2.2 containing 65.9 wt.% isomeric methylene diphenylisocyanate (98.8% 4,4'-, 1.2% 2,4'-, 0% 2,2'-isomer) and 34.1 wt.% higher functionality polymethylene polyphenylpolyisocyanates (viscosity 60 cps. at 25°C.; 31% free isocyanate). The details of preparation and foam properties of the two samples were noted as set forth in the following Table II:

Table II

| Details of Preparation | Sample 1 | Sample 2 |
| --- | --- | --- |
| Cream time, sec. | 13 | 17 |
| Rise time, sec. | 85 | 125 |
| Tack-free time, sec. | 50 | 105 |
| Properties | | |
| Density, pcf. | 2.0 | 2.0 |
| Compressive strength, psi | | |
| with rise | 24.8 | 23 |
| cross rise | 9.4 | 13.8 |
| Heat distortion temperature, °C. | 221 | 238 |
| Closed cells, % | 88.9 | 71.4 |
| Friability[1], % | 60.9 | 86.4 |
| Adhesion[2] | Good | Poor |
| Foam appearance | Small Uniform cells | Large coarse cells |
| Butler Chimney Test[3,4] | | |
| Weight retained, % | 95 | 95 |
| Seconds to extinguish | 10 | 10 |
| Flame height, in. | 3.2 | 3.3 |

[1] ASTM C-421 (1961).
[2] Foam cured 3 days at ambient conditions in cardboard container, determined ease at which foam pulled away from sides of box.
[3] Control foam; % weight retention 94.8, seconds to extinguish 10, flame height 4.5 in.
[4] Kreuger, O.A. and Jackson, D.E., J. Cellular Plastics, 3, 497-501 (1967).

A comparison of the results of Table II shows that the inventive foam, Sample 1, exhibits better foam appearance and superior closed cell content, adhesion and lower friability, and substantially comparable thermal stability as compared to the related foam, Sample 2, employing the related polymethylene polyphenylpolyisocyanate mixture having a comparable wt.% of methylene diphenylisocyanate, but having a different isomer content.

From the foregoing description and Examples of this invention, those of ordinary skill in the art may make many modifications and variations therefrom without departing from the scope of the invention as hereinafter claimed.

We claim:
1. A modified cellular isocyanurate comprised of the reaction product, formed by bringing together in the presence of an inert blowing agent and an isocyanurate group formation catalyst, of:
  a. a mixture of methylene-bridged polyphenylpolyisocyanates having an average functionality of about 2.1 to about 2.4 consisting essentially of from about 60% to about 75% by weight methylene diphenylisocyanate and from about 40% to about 25% by weight higher functionality methylene-bridged polyphenylpolyisocyanates, said methylene diphenylisocyanate having an isomer content consisting essentially of about 60% to about 80% by weight 4,4'-, about 18% to about 33% by weight 2,4'-, and about 2% to about 7% by weight 2,2'-isomers based on the total weight of said methylene diphenylisocyanate, and
  b. about 0.1 to about 0.5 equivalents, per equivalent of said methylene-bridged polyphenylpolyisocyanate mixture, of a polyether or polyester polyol having a hydroxyl number of from about 100 to about 500 and a molecular weight of about 100 to about 1,000.

2. The modified cellular isocyanurate of claim 1 wherein said mixture of polymethylene-bridged polyphenylpolyisocyanates contains about 67 wt. % methylene diphenylisocyanate having an isomer content of about 74 wt. % 4,4'-, about 22 wt. % 2,4'-, and about 4 wt. % 2,2'-isomers, based on the total weight of said methylene diphenylisocyanate, and about 33 wt. % higher functionality methylene-bridged polyphenylpolyisocyanates.

3. The modified cellular isocyanurate of claim 1 wherein said isocyanurate group formation catalyst is present in an amount of from about 0.03% to about 5.0%, by weight, based upon the total weight of said reaction product.

4. The modified cellular isocyanurate of claim 1 wherein from about 0.1 to about 0.5 equivalents of a polyether polyol is present, said polyether polyol having a molecular weight of about 100 to about 1,000.

5. The modified cellular isocyanurate of claim 1 wherein said reaction product includes from about zero to about 20%, by weight, of a compatible fire retardant, based upon the total weight of said reaction product.

* * * * *